US010864891B2

(12) United States Patent
Haneda et al.

(10) Patent No.: US 10,864,891 B2
(45) Date of Patent: Dec. 15, 2020

(54) CONTROL DEVICE, MONITORING DEVICE AND CONTROL PROGRAM

(71) Applicant: HONDA MOTOR CO., LTD., Tokyo (JP)

(72) Inventors: Satoshi Haneda, Saitama (JP); Takamasa Udagawa, Saitama (JP); Makoto Yamamura, Saitama (JP); Masato Fujiwara, Saitama (JP); Ryuichi Kimata, Tokyo (JP); Satoshi Onodera, Tokyo (JP); Yutaka Tsuji, Tokyo (JP); Hiroyuki Isegawa, Tokyo (JP)

(73) Assignee: HONDA MOTOR CO., LTD., Tokyo (JP)

( * ) Notice: Subject to any disclaimer, the term of this patent is extended or adjusted under 35 U.S.C. 154(b) by 0 days.

(21) Appl. No.: 16/454,100

(22) Filed: Jun. 27, 2019

(65) Prior Publication Data

US 2019/0315314 A1    Oct. 17, 2019

Related U.S. Application Data

(63) Continuation of application No. PCT/JP2017/045003, filed on Dec. 14, 2017.

(30) Foreign Application Priority Data

Dec. 28, 2016   (JP) ................................ 2016-257005

(51) Int. Cl.
    *G08G 1/00*       (2006.01)
    *B60R 25/31*      (2013.01)
    (Continued)

(52) U.S. Cl.
    CPC ............ *B60R 25/31* (2013.01); *B60R 25/305* (2013.01); *G05D 1/0088* (2013.01);
    (Continued)

(58) Field of Classification Search
    CPC ..... Y10S 901/01; B60R 25/31; A01D 34/008; G05D 2201/0208; G05D 1/0246;
    (Continued)

(56) References Cited

U.S. PATENT DOCUMENTS 10,034,421 B2 *   7/2018   Doughty .............. G05D 1/0044
2013/0184924 A1 * 7/2013   Jagenstedt ........... A01D 34/008
                                                                701/23

(Continued)

FOREIGN PATENT DOCUMENTS

EP          3097755 A1    11/2016
JP       2006134218 A     5/2006
(Continued)

OTHER PUBLICATIONS

International Search Report and (ISA/237) Written Opinion of the International Search Authority for International Patent Application No. PCT/JP2017/045003, issued/mailed by the Japan Patent Office dated Mar. 2, 2018.

(Continued)

*Primary Examiner* — Toan N Pham

(57) ABSTRACT

A detecting section detecting a change in a monitoring target of a monitoring device; and an operation mode deciding section deciding an operation mode of the device according to a detail of the change in the monitoring target detected by the detecting section are included. The device may have a work instrument for executing a second work different from a first work selected from a group of monitoring, security and guard works for the monitoring target. The operation mode deciding section may have: an alert level deciding section deciding an alert level indicating a level of threat to the monitoring target, according to the detail of the change in the monitoring target detected by the detecting section; and a second operation mode deciding section deciding a second operation mode indicating an operation detail about (Continued)

the second work, according to the alert level decided by the alert level deciding section.

17 Claims, 10 Drawing Sheets

(51) Int. Cl.
*B60R 25/30* (2013.01)
*G05D 1/00* (2006.01)
*G05D 1/02* (2020.01)

(52) U.S. Cl.
CPC ......... *G05D 1/0094* (2013.01); *G05D 1/0246* (2013.01); *G05D 2201/0208* (2013.01); *G05D 2201/0209* (2013.01)

(58) Field of Classification Search
CPC .. G05D 1/0094; G05D 1/0278; G05D 1/0214; G06F 19/00
See application file for complete search history.

(56) References Cited

U.S. PATENT DOCUMENTS

| | | | | |
|---|---|---|---|---|
| 2013/0212994 A1* | 8/2013 | Hwang | ................ | A01D 34/008 56/10.2 A |
| 2015/0163993 A1* | 6/2015 | Pettersson | ............ | A01D 34/008 701/28 |
| 2016/0278287 A1 | 9/2016 | Kasai | | |
| 2016/0338262 A1 | 11/2016 | Liu | | |
| 2018/0137728 A1 | 5/2018 | Hahn | | |
| 2019/0369640 A1* | 12/2019 | He | .......................... | G01S 19/23 |

FOREIGN PATENT DOCUMENTS

| | | |
|---|---|---|
| JP | 2007133625 A | 5/2007 |
| JP | 2013169221 A | 9/2013 |
| JP | 2013169225 A | 9/2013 |
| JP | 2013223531 A | 10/2013 |
| JP | 2016139343 A | 8/2016 |
| JP | 2016185182 A | 10/2016 |
| WO | 2012098519 A1 | 7/2012 |
| WO | 2016097897 A1 | 6/2016 |

OTHER PUBLICATIONS

Office Action issued for counterpart Japanese Application No. 2016-257005, drafted by the Japan Patent Office dated Sep. 10, 2019.

* cited by examiner

| SECURITY LEVEL | OPERAT. MODE OF LAWN MOWING WORK | OPERAT. MODE OF SECURITY WORK |
|---|---|---|
| 0 | NORMAL MODE (ACCORDING TO USER SETTING) | NORMAL MONITOR. MODE |
| 1 | HIGH-SPEED MODE | MOTION IMAGE TRACKING MODE |
| 2 | POWER-SAVE MODE | CLOSE-UP MONITOR. MODE |
| 3 | STOP WORK | TRACKING/ALERT MODE |
| 4 | STOP WORK | INTIMIDATION MODE |

FIG. 8

| OPERAT. MODE OF LAWN MOWING WORK | METHOD OF CONTROLLING MOTORS FOR RUN 616 | METHOD OF CONTROLLING WORK UNIT 620 |
|---|---|---|
| STOP WORK | NORMAL | STOP |
| QUALITY PRIORITIZED MODE | W/ FEEDBACK CONTROL BASED ON LAW MOWING QUALITY | W/ FEEDBACK CONTROL BASED ON LAW MOWING QUALITY |
| HIGH-SPEED MODE (SIMPLE OPERAT. MODE) | HIGH-SPEED | W/O FEEDBACK CONTROL BASED ON LAW MOWING QUALITY |
| POWER-SAVE MODE | LOW-SPEED | LOW-SPEED |

FIG. 9

CONTROL DEVICE, MONITORING DEVICE AND CONTROL PROGRAM

CROSS REFERENCE TO RELATED APPLICATION

This is a continuation application of International Application No. PCT/JP2017/045003 filed on Dec. 14, 2017, which claims priority to Japanese Patent Application No. 2016-257005 filed in JP on Dec. 28, 2016, the contents of each of which are incorporated herein by reference.

BACKGROUND

1. Technical Field

The present invention relates to a control device, a monitoring device and a control program.

2. Related Art

In recent years, lawn mowers, cleaners and the like that run autonomously to work have been developed (please see Patent Documents 1 to 4). Also, it has been known that upon a cleaner including a motion sensor sensing a human around the cleaner, the cleaner decides a running route, switches to a silent mode, and so on (please see Patent Documents 3 to 4).

PATENT DOCUMENTS

[Patent Document 1] Japanese Patent Application Publication No. 2016-185099
[Patent Document 2] Japanese Patent Application Publication No. 2013-223531
[Patent Document 3] Japanese Patent Application Publication No. 2013-169221
[Patent Document 4] Japanese Patent Application Publication No. 2013-169225

BRIEF DESCRIPTION OF DRAWINGS

FIG. 8 schematically shows one example of a data table 800.
FIG. 9 schematically shows one example of a data table 900.

DESCRIPTION OF EXEMPLARY EMBODIMENTS

Hereinafter, (some) embodiment(s) of the present invention will be described. The embodiment(s) do(es) not limit the invention according to the claims, and all the combinations of the features described in the embodiment(s) are not necessarily essential to means provided by aspects of the invention. Identical or similar portions in figures are given identical reference numbers, and the same explanation is omitted in some cases.

Figure 1:
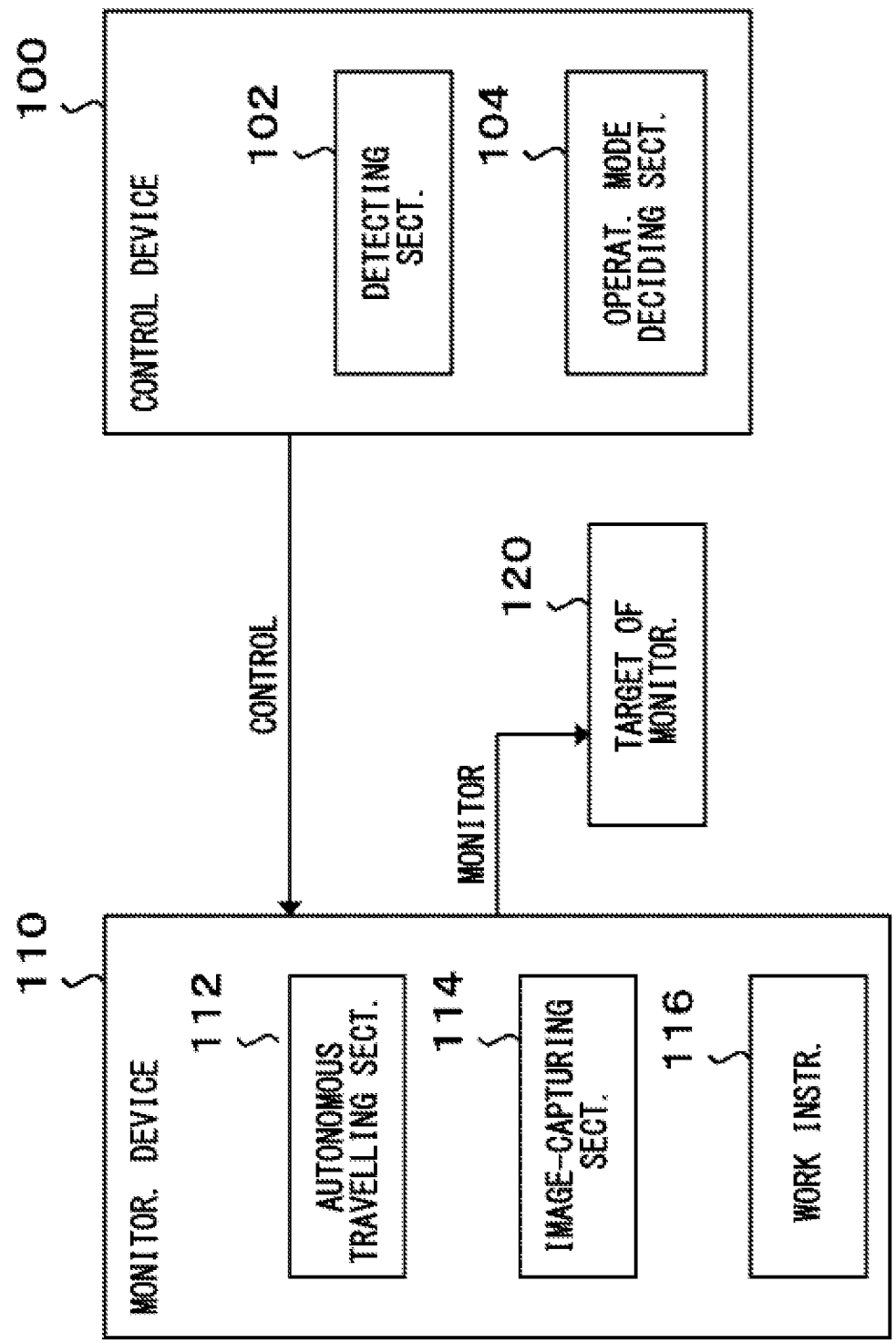
FIG. 1 schematically shows one example of the system configuration of a control device 100.

[Outline of Control Device 100] FIG. 1 schematically shows one example of the system configuration of a control device 100. In the present embodiment, the control device 100 includes a detecting section 102 and an operation mode deciding section 104. The control device 100 controls a monitoring device 110. In the present embodiment, the monitoring device 110 includes an autonomous travelling section 112, an image-capturing section 114 and a work instrument 116. The monitoring device 110 monitors a target of monitoring 120. The target of monitoring 120 may be humans, objects, or an area having a predetermined geographic range.

In the present embodiment to be explained, the control device 100 and the monitoring device 110 are independent devices. However, the control device 100 and the monitoring device 110 are not limited to the present embodiment. In another embodiment, the control device 100 may constitute part of the monitoring device 110. Also, the control device 100 may be disposed inside the same housing inside which the monitoring device 110 is also disposed, or may be disposed inside a housing that is different from a housing inside which the monitoring device 110 is disposed.

In the present embodiment, the detecting section 102 detects a change in the target of monitoring 120 of the monitoring device 110. The change in the target of monitoring 120 may be a change in the appearance of the target of monitoring 120 or a change in the state of the target of monitoring 120. The change in the state of the target of monitoring 120 may be a change in the surrounding environment of the target of monitoring 120.

For example, if the target of monitoring 120 is a particular area, and if a suspicious person or suspicious object intrudes into the target of monitoring 120, a change occurs to the appearance of the target of monitoring 120. Also, if a suspicious person is roaming about the target of monitoring 120, the target of monitoring 120 is exposed to a threat of the suspicious person, and thereby a change occurs to the state of the target of monitoring 120. Examples of the threat that can cause a change in the state of the target of monitoring 120 may include a suspicious person, a suspicious object, a disaster, an accident and the like. An object that can pose a threat to the target of monitoring 120 may be a solid body, liquid or gas.

The detecting section 102 may detect a change in the target of monitoring 120 based on an image of the target of monitoring 120. For example, the detecting section 102 detects a change in the target of monitoring 120 based on an image captured by the image-capturing section 114 of the monitoring device 110.

In information processing of the detecting section 102, a known image recognition technology may be utilized, or an image recognition technology to be newly developed in the future may be utilized. In an image recognition process, an image recognition technology utilizing machine learning may be utilized. In the information processing of the detecting section 102, machine learning may be utilized. Machine learning may be supervised learning, unsupervised learning or reinforcement learning. In the learning process, learning techniques using a neural network technology, a deep-learning technology and the like may be used.

In the present embodiment, the operation mode deciding section 104 decides an operation mode of the monitoring device 110 based on a detail of a change in the target of monitoring 120 detected by the detecting section 102. For example, the operation mode deciding section 104 selects, from a plurality of operation modes, an operation mode corresponding to a detail in a detected change in the target of monitoring 120.

The operation mode deciding section 104 may (i) decide an operation mode based on a predetermined determination criterion, or (ii) decide an operation mode utilizing a learning model obtained through machine learning. The above-mentioned determination criterion may be information in which one or more factors (which may be sometimes referred to as factors to consider), conditions about respective factors to consider, and operation modes are associated with each other.

In one embodiment, an operation mode of the monitoring device 110 stipulates an operation about security. The operation about security may be any operation about crime prevention or disaster prevention, and for example, examples of the operation may include an operation about at least one work among a monitoring work, a security work and a guard work (which may be sometimes referred to as a first work or a security work). In another embodiment, the operation mode of the monitoring device 110 stipulates various types of operations other than an operation about a security work.

In the present embodiment, the operation mode deciding section 104 includes an alert level deciding section (not illustrated in figures) that decides an alert level indicating the level of threat to a target of monitoring, according to a detail of a change in the target of monitoring detected by the detecting section. The operation mode deciding section 104 may have a first operation mode deciding section (not illustrated in figures) that decides a first operation mode according to the alert level decided by the alert level deciding section. The first operation mode indicates a detail of an operation about at least one among a monitoring work, a security work and a guard work of the monitoring device. The operation mode deciding section 104 may have a second operation mode deciding section (not illustrated in figures) that decides a second operation mode according to the alert level decided by the alert level deciding section. The second operation mode indicates a detail of an operation about a second work different from a first work that is selected from a group consisting of a monitoring work, a security work and a guard work of a target of monitoring.

The operation mode deciding section 104 may control the monitoring device 110 based on an operation mode decided by the operation mode deciding section 104. For example, the operation mode deciding section 104 generates an instruction for controlling the monitoring device 110 based on the decided operation mode. The operation mode deciding section 104 may control the monitoring device 110 by transmitting the generated instruction to the monitoring device 110.

In the present embodiment, the monitoring device 110 has an autonomous travel function. For example, the monitoring device 110 travels by automatic operation by a computer mounted thereon. The monitoring device 110 may travel under control of the control device 100. The monitoring device 110 may travel by remote manipulation by a user. The monitoring device 110 may be a travelling body to run autonomously or a travelling body to fly autonomously. The monitoring device 110 may be a travelling body to travel in or on water.

In the present embodiment, the autonomous travelling section 112 causes the monitoring device 110 to travel. The autonomous travelling section 112 may include a thrust generating section (not illustrated in figures) such as a wheel or a propeller, a driving section (not illustrated in figures) that drives the thrust generating section, and a control section (not illustrated in figures) that controls autonomous travel of the monitoring device 110. The autonomous travelling section 112 may cause the monitoring device 110 to travel autonomously according to control by the control device 100. Examples of the driving section may include an engine, a motor, a prime mover and the like. The autonomous travelling section 112 may include a positional information acquiring section (not illustrated in figures) that acquires positional information indicating a position of the monitoring device 110. Examples of the positional information acquiring section may include a GPS signal receiver, a beacon signal receiver, a radio field intensity measuring machine, a millimeter wave sensor, a magnetic sensor, a camera, an infrared camera, a microphone, an ultrasonic wave sensor and the like.

In the present embodiment, the image-capturing section 114 captures an image of the target of monitoring 120. The image-capturing section 114 may capture an image of the space around the monitoring device 110. The image-capturing section 114 may transmit, to the detecting section 102, data of an image of the target of monitoring 120 (which may be sometimes referred to as image data of the target of monitoring 120). The above-mentioned image may be a still image or moving image. The monitoring device 110 may have a single image-capturing section 114 or a plurality of image-capturing sections 114. A single image-capturing section 114 may have a single image sensor or a plurality of image sensors. The image-capturing section 114 may be used exclusively for a use of capturing an image of the target of monitoring 120 or may be used for a plurality of uses.

In the present embodiment, the work instrument 116 executes a second work different from a first work selected from a group consisting of a monitoring work, a security work and a guard work of a target of monitoring. Examples of the second work may include pruning, lawn mowing, grass mowing, watering, fertilization, cleaning, transportation and the like.

According to the control device 100 according to the present embodiment, the operation mode deciding section 104 decides an operation mode of the monitoring device 110 based on a detail of a change in the target of monitoring 120. For example, even if a suspicious person is detected around the target of monitoring 120, if the suspicious person is unlikely to pose a threat to the target of monitoring 120, the monitoring device 110 continues another work other than a monitoring work while monitoring the suspicious person. On the other hand, if it becomes more likely that the above-mentioned suspicious person poses a threat to the target of monitoring 120, the monitoring device 110 discontinues the work other than the monitoring work, and starts an operation to eliminate the suspicious person. In the above-mentioned manner, the monitoring device 110 for example can monitor the target of monitoring 120 while suppressing degradation of the efficiency of a work other than a monitoring work.

[Specific Configuration of Each Section of Control Device 100 and Monitoring device 110] Each section of the control device 100 and monitoring device 110 may be realized by hardware, software, or hardware and software. Each section of the control device 100 or monitoring device 110 may at least partially be realized by a single server or a plurality of servers. Each section of the control device 100 or monitoring device 110 may at least partially be realized on a virtual server or cloud system. Each section of the control device 100 or monitoring device 110 may at least partially be realized by a personal computer or mobile terminal. Examples of the mobile terminal may include a mobile phone, a smartphone, a PDA, a tablet, a notebook computer or laptop computer, a wearable computer and the like. The control device 100 or monitoring device 110 may store information utilizing a distributed ledger technology or distributed network such as a blockchain.

If at least some of components constituting the control device 100 or monitoring device 110 are realized by software, the components realized by the software may be realized by activating, in an information processing device having a general configuration, software or a program stipulating operations about the components. The above-mentioned information processing device may include: (i) a data processing device having processors such as a CPU or a GPU, a ROM, a RAM, a communication interface and the like, (ii) input devices such as a keyboard, a touch panel, a camera, a microphone, various types of sensors or a GPS receiver, (iii) output devices such as a display device, a speaker or a vibration device, and (iv) storage devices (including external storage devices) such as a memory or a HDD. In the above-mentioned information processing device, the above-mentioned data processing device or storage devices may store the above-mentioned software or program. Upon being executed by a processor, the above-mentioned software or program causes the above-mentioned information processing device to execute operations stipulated by the software or program. The above-mentioned software or program may be stored in a non-transitory computer-readable recording medium.

The above-mentioned software or program may be a control program for controlling the monitoring device 110. The above-mentioned control program is, for example, a program for causing a computer to execute a detection procedure of detecting a change in the target of monitoring 120 of the monitoring device 110 and an operation mode decision procedure of deciding an operation mode of the monitoring device 110 according to a detail of the change in the target of monitoring 120 detected in the detection procedure. The above-mentioned control program may be a program for causing a computer to execute a control procedure of controlling the monitoring device based on the operation mode decided in the operation mode decision procedure. The above-mentioned computer may be a computer mounted on the monitoring device 110 (which is, for example, a processor of the monitoring device 110), or may be a computer that controls the monitoring device 110 via a communication network.

Figure 2:
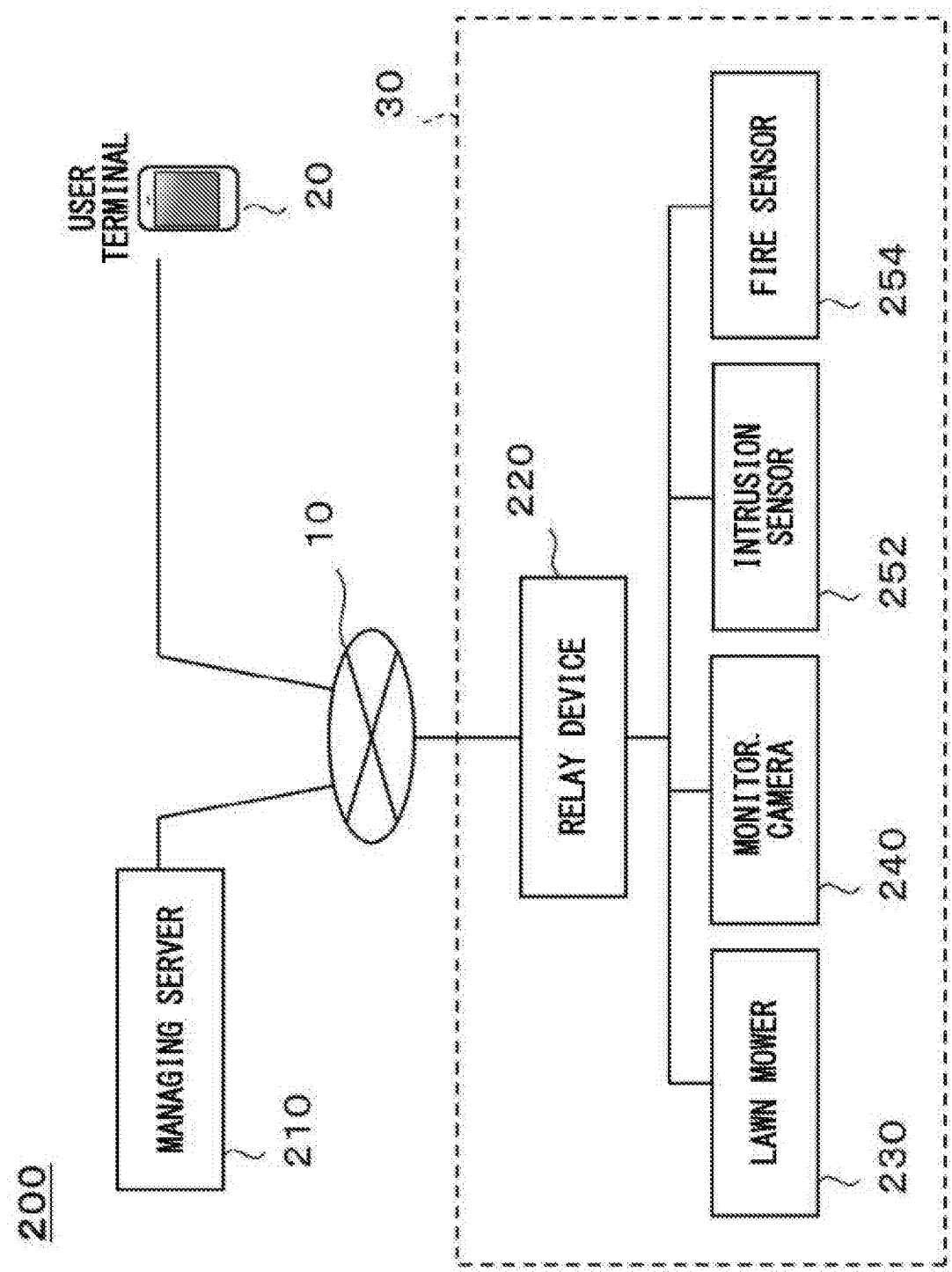
FIG. 2 schematically shows one example of the system configuration of a security system 200.
Figure 3:
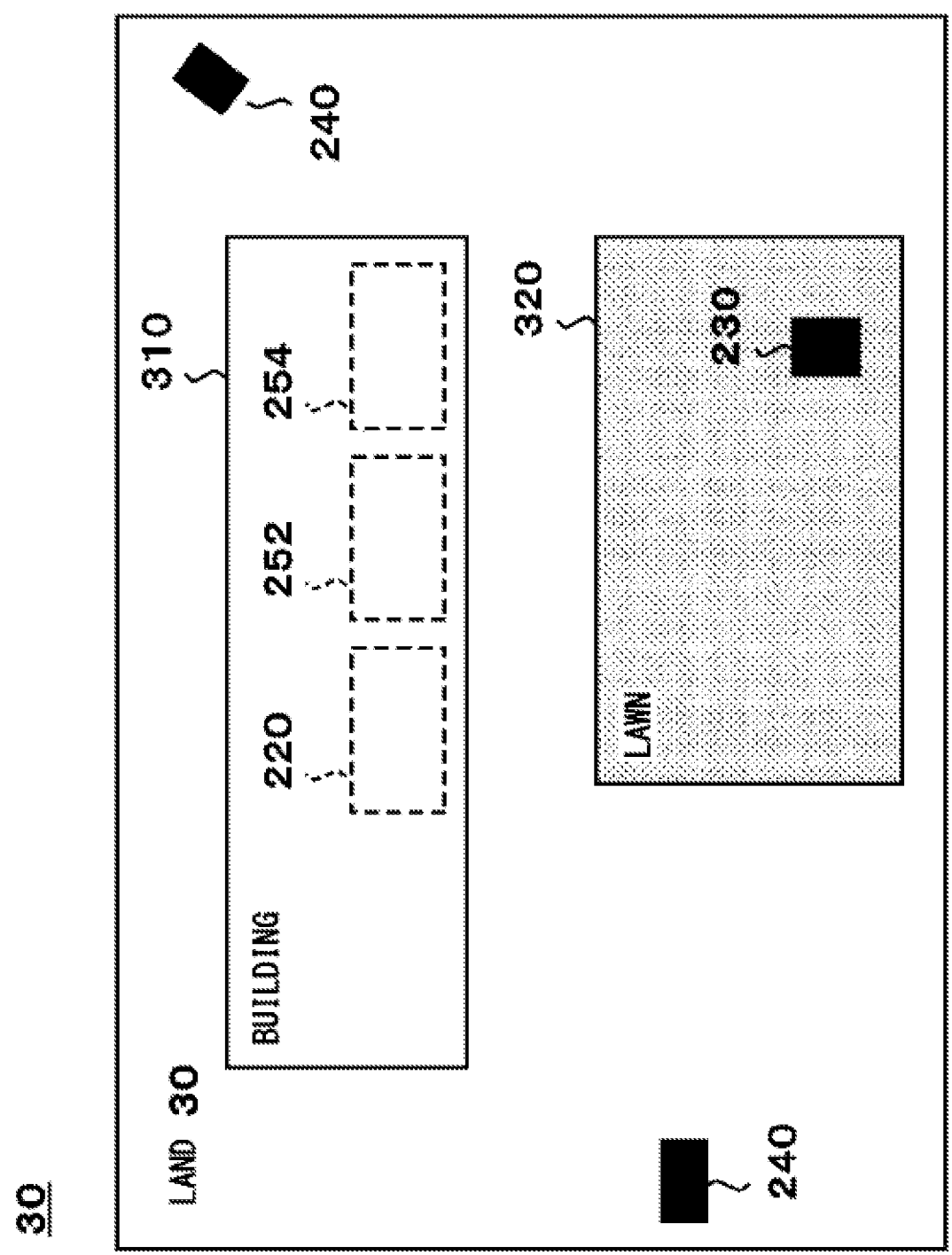
FIG. 3 schematically shows one example of a monitoring instrument disposed in a land 30.

[Outline of Security System 200] Using FIG. 2 and FIG. 3, outline of a security system 200 that monitors a land 30 is explained. FIG. 2 schematically shows one example of the system configuration of the security system 200. FIG. 3 schematically shows one example of a monitoring instrument disposed in the land 30. In the present embodiment, each section of the security system 200 can transmit and receive information to and from each other via a communication network 10. Each section of the security system 200 may transmit and receive information with a user terminal 20 via the communication network 10.

In the present embodiment, the communication network 10 may be a wired communication transmission path, a wireless communication transmission path, or a combination of a wireless communication transmission path and a wired communication transmission path. The communication network 10 may include a wireless packet communication network, the Internet, a P2P network, a private line, a VPN, an electric power line communication line and the like. The communication network 10: (i) may include a mobile communication network such as a mobile phone line network; and (ii) may include a wireless communication network such as a wireless MAN (for example, WiMAX (registered trademark)), a wireless LAN (for example, WiFi (registered trademark)), Bluetooth (registered trademark), Zigbee (registered trademark) or NFC (Near Field Communication).

In the present embodiment, the user terminal 20 is a communication terminal that a user of the land 30, the security system 200 or a lawn mower 230 utilizes, and a detail thereof is not particularly limited. Examples of the user terminal 20 may include a personal computer, mobile terminal and the like. Examples of the mobile terminal may include a mobile phone, a smartphone, a PDA, a tablet, a notebook computer or laptop computer, a wearable computer and the like.

As shown in FIG. 2, in the present embodiment, the security system 200 includes a managing server 210, a relay device 220, the lawn mower 230, a monitoring camera 240, an intrusion sensor 252 and a fire sensor 254. As shown in FIG. 3, in the present embodiment, a building 310 and lawn 320 are disposed in the land 30. In the present embodiment, the relay device 220, the intrusion sensor 252 and the fire sensor 254 are disposed inside the building 310, and the lawn mower 230 and the monitoring camera 240 are disposed outside the building 310. The lawn mower 230 executes lawn mowing on the lawn 320 as a work other than a monitoring work.

The security system 200 may be one example of a control device. The security system 200 may be one example of a monitoring system including a control device and a monitoring device. The managing server 210 may be one example of a control device. The lawn mower 230 may be one example of a monitoring device. The lawn mower 230 may be one example of a control device. The lawn mower 230 may be one example of a sensor or a sensor information acquiring section. The monitoring camera 240 may be one example of a sensor or a sensor information acquiring section. The intrusion sensor 252 may be one example of a sensor or a sensor information acquiring section. The fire sensor 254 may be one example of a sensor or a sensor information acquiring section.

The land 30 may be one example of a target of monitoring by the security system 200 or part thereof. The building 310 may be one example of a target of monitoring by the security system 200 or part thereof. The lawn 320 may be one example of a target of monitoring by the security system 200 or part thereof. The lawn 320 may be one example of a work target of the lawn mower 230. A target of monitoring may be humans, objects, or an area having a predetermined geographic range (which may be sometimes referred to as a monitoring area). The work target may be humans, objects, or an area having a predetermined geographic range (which may be sometimes referred to as a work area).

In the present embodiment, the managing server 210 controls the lawn mower 230. The managing server 210 may control the monitoring camera 240. The managing server 210 may acquire information indicating the appearance or state of at least one among the land 30, the building 310 and the lawn 320 (which may be sometimes referred to as the land 30 and the like). The managing server 210 may control at least either the lawn mower 230 or the monitoring camera 240 based on the above-mentioned information. A detail of a method of controlling the lawn mower 230 or monitoring camera 240 by the managing server 210 is described below. The lawn mower 230 may be one example of a self-running monitoring instrument. The monitoring camera 240 may be a one example of a fixed monitoring instrument.

The information indicating the appearance or state of the land 30 and the like may be information indicating a result of measurement by each among one or more sensors disposed inside the land 30 and the like or an area around the land 30 and the like. Examples of the above-mentioned information indicating a result of measurement may include (i) image data obtained by at least either various types of sensors (including image-capturing devices) mounted on the lawn mower 230 or the monitoring camera 240 capturing an image of the land 30 and the like, (ii) information indicating a result of sensing by the intrusion sensor 252, (iii) information indicating a result of sensing by the fire sensor 254, and the like.

In the present embodiment, the relay device 220 relays communication between (i) at least one among the user terminal 20 and the managing server 210, and (ii) at least one among the lawn mower 230, the monitoring camera 240, the intrusion sensor 252 and the fire sensor 254. The relay device 220 may be a server, a router or an access point.

In the present embodiment, the lawn mower 230 has an autonomous travel function. The lawn mower 230 may travel at least inside the land 30. The lawn mower 230 may execute a plurality of works. The lawn mower 230 may execute (i) a security work and (ii) a work other than the security work. The lawn mower 230 may have a work instrument for executing a work (which may be sometimes referred to as a second work) other than a security work. The second work may be any work different from a security work, and the type of it is not particularly limited. Examples of the second work may include pruning, lawn mowing, grass mowing, watering, fertilization, cleaning, transportation and the like.

The lawn mower 230 may have a plurality of operation modes. Operation modes indicate a detail of operations about works of the lawn mower 230. The lawn mower 230 may have (i) one or more operation modes about a security work, and (ii) one or more operation modes about a work other than the security work. The operation modes about the security work may be one example of a first operation mode. The operation modes about the work other than the security work may be one example of a second operation mode.

In the present embodiment, the lawn mower 230 monitors the land 30 and the like. The lawn mower 230 may transmit, to the relay device 220, information obtained by monitoring the land 30 and the like. The information obtained by monitoring the land 30 and the like may be image data of an image obtained by capturing an image of the land 30 and the like. The above-mentioned image may be a still image or moving image. The lawn mower 230 may transmit, to the relay device 220, positional information indicating a position of the lawn mower 230. The relay device 220 may transmit, to the managing server 210, the information received from the lawn mower 230.

In the present embodiment, the monitoring camera 240 monitors the land 30 and the like. The monitoring camera 240 captures an image of the land 30 and the like. The monitoring camera 240 may transmit, to the relay device 220, image data of an image obtained by capturing an image of the land 30 and the like. The above-mentioned image may be a still image or moving image. The relay device 220 may transmit, to the managing server 210, information received from the monitoring camera 240.

In the present embodiment, the intrusion sensor 252 senses intrusion of a suspicious person or suspicious object into the land 30 or building 310. If having sensed intrusion of a suspicious person or suspicious object, the intrusion sensor 252 may transmit, to the relay device 220, information indicating that the suspicious person or suspicious object has intruded. The relay device 220 may transmit, to the managing server 210, the information received from the intrusion sensor 252.

In the present embodiment, the fire sensor 254 senses occurrence of fire at the land 30 or building 310. If having sensed occurrence of fire, the fire sensor 254 may transmit, to the relay device 220, information indicating that the fire has occurred. The relay device 220 may transmit, to the managing server 210, the information received from the fire sensor 254. Fire may be one example of a disaster or accident.

[Specific Configuration of Each Section of Security System 200] Each section of the security system 200 may be realized by hardware, software, or hardware and software. Each section of the security system 200 may at least partially be realized by a single server or a plurality of servers. Each section of the security system 200 may at least partially be realized on a virtual server or cloud system. Each section of the security system 200 may at least partially be realized by a personal computer or mobile terminal. Examples of the mobile terminal may include a mobile phone, a smartphone, a PDA, a tablet, a notebook computer or laptop computer, a wearable computer and the like. The security system 200 may store information utilizing a distributed ledger technology or distributed network such as a blockchain.

If at least some of components constituting the security system 200 are realized by software, the components realized by the software may be realized by activating, in an information processing device having a general configuration, software or a program stipulating operations about the components. The above-mentioned information processing device may include: (i) a data processing device having processors such as a CPU or a GPU, a ROM, a RAM, a communication interface and the like, (ii) input devices such as a keyboard, a touch panel, a camera, a microphone, various types of sensors or a GPS receiver, (iii) output devices such as a display device, a speaker or a vibration device, and (iv) storage devices (including external storage devices) such as a memory or a HDD. In the above-mentioned information processing device, the above-mentioned data processing device or storage devices may store the above-mentioned software or program. Upon being executed by a processor, the above-mentioned software or program causes the above-mentioned information processing device to execute operations stipulated by the software or program. The above-mentioned software or program may be stored in a non-transitory computer-readable recording medium.

The above-mentioned software or program may be a control program for controlling the lawn mower 230. The above-mentioned control program is, for example, a program for causing a computer to execute a detection procedure of detecting a change in the land 30 of the lawn mower 230 and an operation mode decision procedure of deciding an operation mode of the lawn mower 230 according to a detail of the change in the land 30 detected in the detection procedure. The above-mentioned control program may be a program for causing a computer to execute a control procedure of controlling the lawn mower 230 based on the operation mode decided in the operation mode decision procedure. The above-mentioned computer may be a computer mounted on the lawn mower 230 (which is, for example, a processor of the lawn mower 230), or may be a computer (which is, for example, a processor of the managing server 210) that controls the lawn mower 230 via a communication network.

Figure 4:
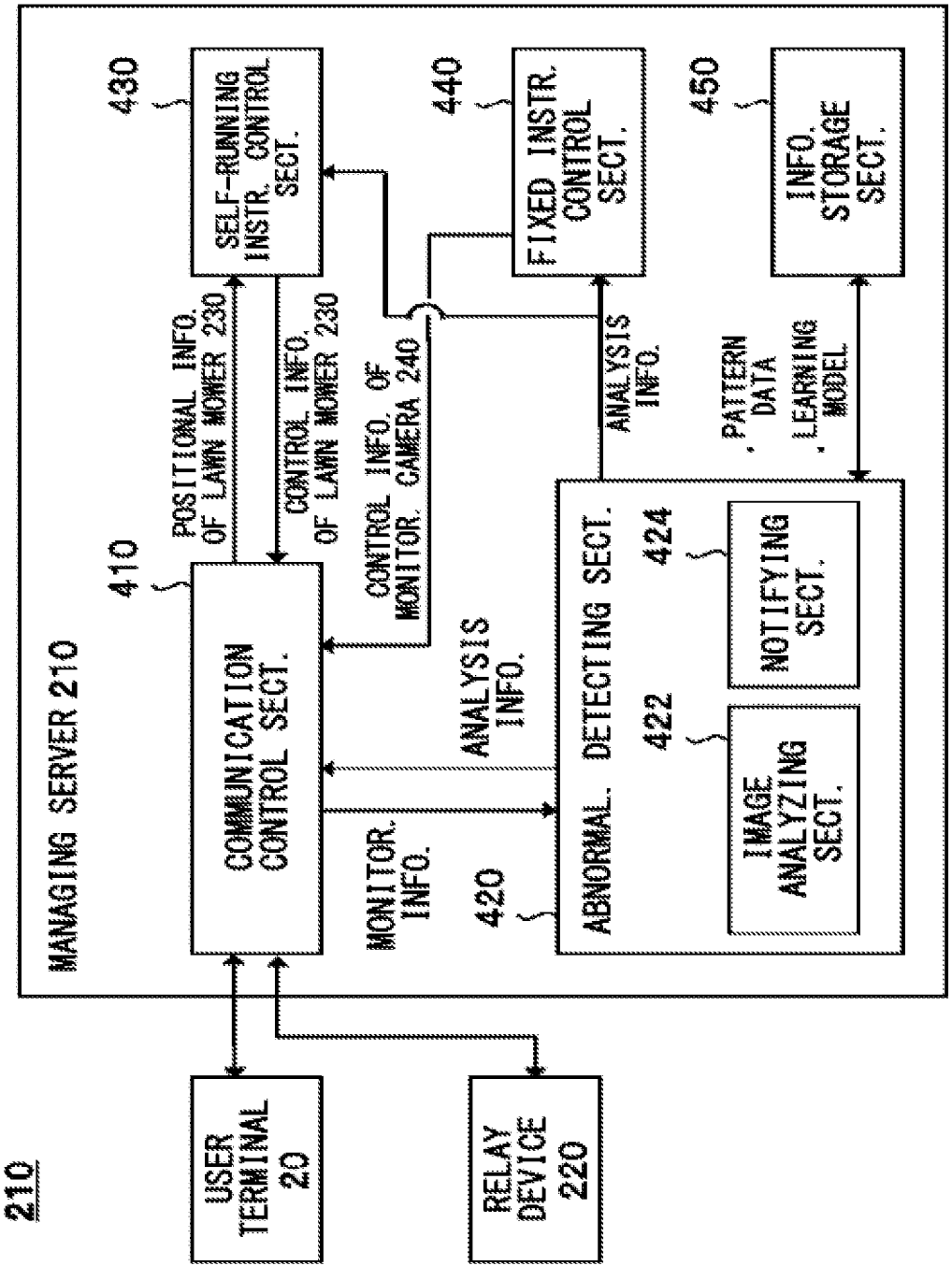
FIG. 4 schematically shows one example of the internal configuration of a managing server 210.

[Outline of Managing Server 210] FIG. 4 schematically shows one example of the internal configuration of the managing server 210. In the present embodiment, the managing server 210 includes a communication control section 410, an abnormality detecting section 420, a self-running instrument control section 430, a fixed instrument control section 440, and an information storage section 450. In the present embodiment, the abnormality detecting section 420 has an image analyzing section 422 and a notifying section 424.

The communication control section 410 may be one example of a positional information acquiring section or a sensor information acquiring section. The abnormality detecting section 420 may be one example of a detecting section. The image analyzing section 422 may be one example of a travelling body detecting section or a travelling body judging section. The self-running instrument control section 430 may be one example of an operation mode deciding section. The information storage section 450 may be one example of a storage section.

In the present embodiment, the communication control section 410 controls communication with an instrument located outside the managing server 210. The communication control section 410 transfers, to an appropriate component in the managing server 210, information received from the instrument located outside the managing server 210. The communication control section 410 transmits, to an instrument located outside the managing server 210, the information received from a component in the managing server 210. The communication control section 410 may be a communication interface compatible with one or more communication systems. Examples of the instrument located outside may include the user terminal 20, the relay device 220, the lawn mower 230, the monitoring camera 240, the intrusion sensor 252, the fire sensor 254 and the like.

In one embodiment, the communication control section 410 acquires information indicating a result of measurement by one or more sensor instruments monitoring the land 30 and the like. The communication control section 410 may acquire information in which information indicating a measurement position and information indicating a result of measurement at the measurement position are associated with each other. The one or more sensor instruments may include at least one image-capturing device. For example, the communication control section 410 acquires information obtained by each instrument among the lawn mower 230, the monitoring camera 240, the intrusion sensor 252 and the fire sensor 254 monitoring the land 30 and the like (which may be sometimes referred to as monitoring information) from each among them. The monitoring information may be one example of sensor information.

In another embodiment, the communication control section 410 acquires positional information indicating a position of the monitoring device. For example, the communication control section 410 acquires information indicating a current position of the lawn mower 230. The communication control section 410 may acquire information indicating an installation position of at least one among the monitoring camera 240, the intrusion sensor 252 and the fire sensor 254.

In the present embodiment, the abnormality detecting section 420 detects a change in the land 30 and the like. For example, the abnormality detecting section 420 receives monitoring information from the communication control section 410. The abnormality detecting section 420 may analyze the monitoring information to detect a change in the land 30 and the like. The change in the land 30 and the like may be a change in the appearance of the land 30 and the like or a change in the state of the land 30 and the like. The change in the state of the land 30 and the like may be a change in the surrounding environment of the land 30 and the like.

[Outline of Image Analyzing Section 422] In the present embodiment, the image analyzing section 422 acquires an image of the land 30 and the like from the communication control section 410. The image analyzing section 422 detects a change in the land 30 and the like based on an image of the land 30 and the like. The image analyzing section 422 transmits analysis information indicating a result of analysis to at least one among the notifying section 424, the self-running instrument control section 430 and the fixed instrument control section 440.

The image analyzing section 422 may analyze image data utilizing a image recognition technology such as pattern recognition. The above-mentioned image recognition technology may be a known image recognition technology, or an image recognition technology to be newly developed in the future. In the above-mentioned image recognition technology, a machine-learning technique or deep-learning technique may be utilized. A pattern model or learning model for image recognition processes is stored in the information storage section 450, for example.

In one embodiment, the image analyzing section 422 detects a travelling body captured in an image (which may be sometimes referred to as a travelling body in an image). For example, the image analyzing section 422 extracts an outline of a travelling body utilizing a learning model constructed through machine learning performed in advance. In another embodiment, the image analyzing section 422 judges an attribute of a travelling body in an image. For example, the image analyzing section 422 judges an attribute of a travelling body utilizing a learning model constructed through machine learning performed in advance.

[One Example of Information Processing at Image Analyzing Section 422] For example, the image analyzing section 422 receives, from the communication control section 410, image data of an image obtained by the lawn mower 230 or monitoring camera 240 capturing an image of the land 30 and the like. The above-mentioned image may be a series of still images or a moving image. The image analyzing section 422 analyzes the above-mentioned image data to detect one or more travelling bodies in the image. Also, the image analyzing section 422 judges, about each travelling body in the image, whether or not the travelling body is a suspicious person or suspicious object. Whether or not a travelling body is a suspicious person or suspicious object may be one example of an attribute of the travelling body. (i) That a travelling body is detected in an image capturing the land 30 and the like and (ii) that the travelling body is a suspicious person or suspicious object may be one example of a change in the land 30 and the like.

For example, if a travelling body is detected in an image capturing the land 30 and the like, the image analyzing section 422 generates analysis information indicating that the travelling body has been detected. Also, if the above-mentioned travelling body is judged as a suspicious person or suspicious object, the image analyzing section 422 generates analysis information indicating that a suspicious person or suspicious object has been detected. The image analyzing section 422 transmits the above-mentioned analysis information to the notifying section 424, the self-running instrument control section 430 and the fixed instrument control section 440.

In information processing of the image analyzing section 422, a known image recognition technology may be utilized, or an image recognition technology to be newly developed in the future may be utilized. In an image recognition process, an image recognition technology utilizing machine learning may be utilized. In the information processing of the image analyzing section 422, machine learning may be utilized. Machine learning may be supervised learning, unsupervised learning or reinforcement learning. In the learning process, learning techniques using a neural network technology, a deep-learning technology and the like may be used. A learning model constructed through machine learning performed in advance is stored for example in the information storage section 450.

The image analyzing section 422 may (i) detect a travelling body based on a predetermined determination criterion or (ii) detect a travelling body utilizing a learning model obtained through machine learning. The above-mentioned determination criterion may be a general criterion for extracting an outline of an object. The above-mentioned determination criterion may be information in which one or more factors (which may be sometimes referred to as factors to consider), conditions about respective factors to consider, and presence or absence of a travelling body are associated with each other. Based on what kind of determination criterion a travelling body is detected may be decided by a user or administrator, or decided through machine learning. A threshold about the above-mentioned determination criterion may be decided by a user or administrator, or decided through machine learning.

In the present embodiment, the notifying section 424 acquires analysis information from the image analyzing section 422. The notifying section 424 may transmit the analysis information to the user terminal 20.

[Outline of Self-Running Instrument Control section 430] In the present embodiment, the self-running instrument control section 430 controls a monitoring instrument having an autonomous travel function. For example, the self-running instrument control section 430 controls the lawn mower 230. If the abnormality detecting section 420 detected a change in the land 30 and the like, the self-running instrument control section 430 may control the lawn mower 230 based on a detail of the change in the land 30 and the like. The self-running instrument control section 430 may generate control information for controlling the lawn mower 230, and transmit the control information to the lawn mower 230.

[One Example of Information Processing at Self-Running Instrument Control section 430] For example, the self-running instrument control section 430 acquires analysis information from the image analyzing section 422. The analysis information for example includes information indicating a detail of a change in the land 30 and the like. The self-running instrument control section 430 decides an operation mode of the lawn mower 230 based on the detail of the change in the land 30 and the like. For example, the self-running instrument control section 430 selects an operation mode corresponding to the detail of the change in the land 30 and the like from a plurality of operation modes of the lawn mower 230. The self-running instrument control section 430 may decide (i) an operation mode about a security work and (ii) an operation mode about a work other than the security work, based on the detail of the change in the land 30 and the like.

In information processing of the self-running instrument control section 430, machine learning may be utilized. Machine learning may be supervised learning, unsupervised learning or reinforcement learning. In the learning process, learning techniques using a neural network technology, a deep-learning technology and the like may be used. A learning model constructed through machine learning performed in advance is stored for example in the information storage section 450.

The self-running instrument control section 430 may (i) decide an operation mode based on a predetermined determination criterion, or (ii) decide an operation mode utilizing a learning model obtained through machine learning. The above-mentioned determination criterion may be information in which one or more factors (which may be sometimes referred to as factors to consider), conditions about respective factors to consider, and operation modes are associated with each other. Based on what kind of determination criterion an operation mode is decided may be decided by a user or administrator, or decided through machine learning. A threshold about the above-mentioned determination criterion may be decided by a user or administrator, or decided through machine learning.

The self-running instrument control section 430 may generate an instruction for causing the lawn mower 230 to operate in the above-mentioned operation mode, and transmit the instruction to the lawn mower 230. The above-mentioned instruction may be one example of a control instruction.

[Outline of Fixed Instrument Control section 440] In the present embodiment, the fixed instrument control section 440 controls a monitoring instrument not having an autonomous travel function. For example, the fixed instrument control section 440 controls the monitoring camera 240. The fixed instrument control section 440 may control an image-capturing condition of the monitoring camera 240. Examples of the image-capturing condition may include an angle of view, a pan-tilt angle, a zoom ratio and the like. For example, the fixed instrument control section 440 may generate control information for controlling the monitoring camera 240, and transmit the control information to the monitoring camera 240.

[One Example of Information Processing at Fixed Instrument Control section 440] If the abnormality detecting section 420 detected a change in the land 30 and the like, the fixed instrument control section 440 may control the monitoring camera 240 based on a detail of the change in the land 30 and the like. For example, the fixed instrument control section 440 acquires analysis information from the image analyzing section 422. The analysis information includes, for example as information indicating a detail of a change in the land 30 and the like, at least either (i) information indicating a position where a travelling body was detected or (ii) information indicating that the travelling body is a suspicious person or suspicious object.

In one embodiment, the fixed instrument control section 440 controls the monitoring camera 240 such that a travelling body is included in the angle of view of the monitoring camera 240, based on information indicating a position where the travelling body was detected. The fixed instrument control section 440 may control the pan-tilt angle of the monitoring camera 240 to adjust the image-capturing direction of the monitoring camera 240 such that the monitoring camera 240 tracks the travelling body. The fixed instrument control section 440 may control the monitoring camera 240 so as to increase the zoom magnification. In another embodiment, if a travelling body is a suspicious person or suspicious object, the fixed instrument control section 440 may control the monitoring camera 240 such that an alert message is output from a speaker of the monitoring camera 240. In this case, the fixed instrument control section 440 may control the monitoring camera 240 to cause a light-emitting device of the monitoring camera 240 to emit light.

In a process of deciding a method of controlling the monitoring camera 240, a machine-learning technique or deep-learning technique may be utilized. A learning model constructed through machine learning performed in advance is stored for example in the information storage section 450. The fixed instrument control section 440 may generate an instruction for controlling the monitoring camera 240 in the above-mentioned manner, and transmit the instruction to the lawn mower 230. The above-mentioned instruction may be one example of a control instruction.

In the present embodiment, the information storage section 450 stores various types of information. The information storage section 450 may store information that the managing server 210 acquired from an instrument located outside. In one embodiment, the information storage section 450 may store information to be utilized in image analysis processing at the image analyzing section 422. For example, the information storage section 450 stores learning data for machine learning of the image analyzing section 422. The information storage section 450 may store a learning model constructed through the above-mentioned machine learning. The information storage section 450 may store information indicating a result of analysis by the image analyzing section 422.

In another embodiment, the information storage section 450 may store information to be utilized in a decision process at at least either the self-running instrument control section 430 or the fixed instrument control section 440. For example, the information storage section 450 stores learning data for machine learning of the self-running instrument control section 430 or the fixed instrument control section 440. The information storage section 450 may store a learning model constructed through the above-mentioned machine learning. The information storage section 450 may store information indicating a result of decision by the self-running instrument control section 430 or the fixed instrument control section 440.

In still another embodiment, the information storage section 450 stores information about a work plan of the lawn mower 230. The work plan may be sometimes updated according to a change in the land 30 and the like. If the work plan is to be updated, the information storage section 450 stores information about a work before being updated. Examples of the information about a work before being updated may include information indicating a work plan before being updated, information indicating the progress of a work plan before being updated, and the like.

In the present embodiment explained, the managing server 210 includes the abnormality detecting section 420, the self-running instrument control section 430, the fixed instrument control section 440 and the information storage section 450. However, the security system 200 is not limited to the present embodiment. In another embodiment, at least one among the abnormality detecting section 420, the self-running instrument control section 430, the fixed instrument control section 440 and the information storage section 450 may be disposed in the relay device 220. In still another embodiment, at least one among the abnormality detecting section 420, the self-running instrument control section 430, the fixed instrument control section 440 and the information storage section 450 may be disposed in the lawn mower 230. The self-running instrument control section 430 may be disposed in the lawn mower 230, and the abnormality detecting section 420 and the self-running instrument control section 430 may be disposed in the lawn mower 230.

Figure 5:
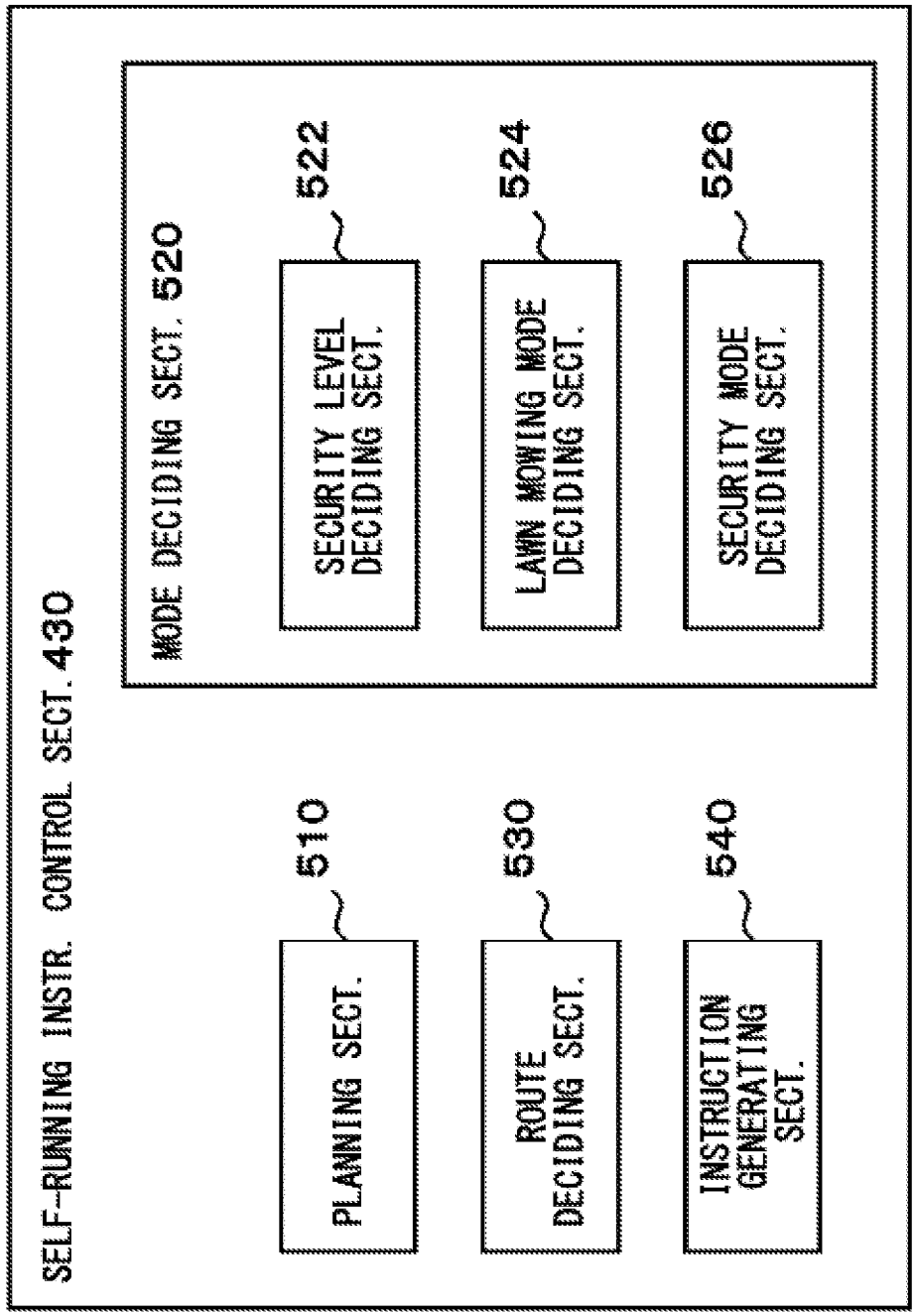
FIG. 5 schematically shows one example of the internal configuration of a self-running instrument control section 430.

FIG. 5 schematically shows one example of the internal configuration of the self-running instrument control section 430. In the present embodiment, the self-running instrument control section 430 is explained taking as an example a case where the lawn mower 230 includes a lawn mowing device, and the lawn mower 230 executes a lawn mowing work as a work other than a security work. Works of the lawn mower 230 are not limited to a lawn mowing work. The lawn mowing device may be one example of a work instrument.

In the present embodiment, the self-running instrument control section 430 includes a planning section 510, a mode deciding section 520, a route deciding section 530 and an instruction generating section 540. In the present embodiment, the mode deciding section 520 has a security level deciding section 522, a lawn mowing mode deciding section 524 and a security mode deciding section 526.

The planning section 510 may be one example of a work plan deciding section. The mode deciding section 520 may be one example of an operation mode deciding section. The security level deciding section 522 may be one example of an alert level deciding section. The lawn mowing mode deciding section 524 may be one example of a second operation mode deciding section. The security mode deciding section 526 may be one example of a first operation mode deciding section. The route deciding section 530 may be one example of an approach route deciding section.

[Outline of Planning Section 510] In the present embodiment, the planning section 510 creates a work plan of the lawn mower 230. The planning section 510 may create a work plan about a work other than a security work. The work plan for example includes information about a detail of a work, a time schedule of a work, a route to execute a work, and the like.

The work plan may include information about at least one among: (i) a work target of the lawn mowing device; (ii) timing or a sequence for the lawn mowing device to execute a work; (iii) the type of a resource of the lawn mower 230 or managing server 210 allocated to an operation of the lawn mowing device; (iv) the amount or ratio of a resource of the lawn mower 230 or managing server 210 allocated to an operation of the lawn mowing device; and (v) a detail of a process to be executed by a resource of the lawn mower 230 or managing server 210 allocated to an operation of the lawn mowing device. The work plan may include information about at least one among: (vi) the type of a resource of the lawn mower 230 or managing server 210 allocated to an operation about a security work of the lawn mower 230; (vii) the amount or ratio of a resource of the lawn mower 230 or managing server 210 allocated to an operation about a security work of the lawn mower 230; and (viii) a detail of a process to be executed by a resource of the lawn mower 230 or managing server 210 allocated to an operation about a security work of the lawn mower 230.

In one embodiment, the planning section 510 decides a work plan of the lawn mower 230 based on (i) a detail of a change in the land 30 and the like detected by the abnormality detecting section 420 or (ii) a security level decided by the security level deciding section 522. The planning section 510 may decide a work plan of the lawn mower 230 based on (i) a detail of a change in the land 30 and the like detected by the abnormality detecting section 420 and (ii) a security level decided by the security level deciding section 522.

For example, if the lawn mower 230 includes a single image-capturing device, the planning section 510 decides whether to utilize the image-capturing device in a lawn mowing work or in a monitoring work, according to a security level. Also, for example, if the lawn mower 230 includes a plurality of image-capturing devices, the planning section 510 decides to allocate a number, corresponding to a security level, of image-capturing devices to a monitoring work, and allocate the remaining image-capturing devices to a lawn mowing work. The image-capturing device may be one example of a resource of the lawn mower 230.

In another embodiment, if a security level decided by the security level deciding section 522 is changed while the lawn mowing device is working, the planning section 510 decides whether a work plan needs to be updated or not. If the planning section 510 decided to update the work plan, it may store information about a work before being updated in the information storage section 450.

[One Example of Information Processing at Planning Section 510] For example, the planning section 510 decides a work plan of a work to be performed this time, taking into consideration a work history of previous works, the growth state of lawn grasses, and the like, before the lawn mower 230 starts a lawn mowing work. At this time, the planning section 510 may decide a work plan based on a security level decided by the security level deciding section 522. The work plan for example includes information about an area to be a target of a work to be performed this time, a route of the lawn mower 230, a work strength of a lawn mowing work at each position on a route, and the like.

Next, the lawn mower 230 executes a lawn mowing work according to the above-mentioned work plan. For example, if a suspicious person intrudes into the land 30 while the lawn mower 230 is executing a lawn mowing work, the security level deciding section 522 decides to change a security level. If the security level is changed, the planning section 510 determines whether or not it is necessary to update a work plan. If the planning section 510 determines that it is necessary to update the work plan, it decides a new work plan based on the security level after being changed.

In the present embodiment, the mode deciding section 520 decides an operation mode of the lawn mower 230. The mode deciding section 520 decides an operation mode of the lawn mower 230 based on a detail of a change in the land 30 and the like. For example, the mode deciding section 520 decides an operation mode corresponding to a detail of a change in the land 30 and the like from a plurality of operation modes of the lawn mower 230. The mode deciding section 520 may decide an operation mode corresponding to a detail of a change in the land 30 and the like, by deciding an operation mode corresponding to a security level.

In the present embodiment, the security level deciding section 522 decides a security level of the land 30 and the like. The security level deciding section 522 transmits information indicating the decided security level to at least one among the planning section 510, the lawn mowing mode deciding section 524 and the security mode deciding section 526. The security level for example indicates the level of threat to the land 30 and the like. The security level may be (i) an index obtained by evaluating, with consecutive numerical values, the above-mentioned level of threat, or (ii) an index obtained by evaluating stepwise, with a plurality of steps, the level of threat. The security level may be one example of an alert level.

For example, the security level deciding section 522 acquires analysis information from the image analyzing section 422. The analysis information for example includes information indicating a detail of a change in the land 30 and the like. The security level deciding section 522 decides a security level of the land 30 and the like based on the detail of the change in the land 30 and the like. The security level deciding section 522 transmits information indicating the decided security level for example to the planning section 510, the lawn mowing mode deciding section 524 and the security mode deciding section 526.

In the present embodiment, the lawn mowing mode deciding section 524 decides an operation mode about a lawn mowing work. The operation mode may be information indicating a detail of an operation. For example, the lawn mowing mode deciding section 524 acquires, from the security level deciding section 522, information indicating a security level. According to the security level, the lawn mowing mode deciding section 524 decides an operation mode about a lawn mowing work. The information indicating an operation mode about a lawn mowing work may be transmitted to the instruction generating section 540.

In the present embodiment, the security mode deciding section 526 decides an operation mode about a security work of the lawn mower 230. For example, the security mode deciding section 526 acquires, from the security level deciding section 522, information indicating a security level. According to the security level, the security mode deciding section 526 decides an operation mode about a security work.

The security mode deciding section 526 may transmit, to the instruction generating section 540, information indicating an operation mode about a security work. if an operation stipulated by an operation mode decided by the security mode deciding section 526 includes an operation to approach a suspicious person or suspicious object, the security mode deciding section 526 may transmit, to the route deciding section 530, (i) information indicating an operation mode about a security work or (ii) information indicating that the lawn mower 230 is to be caused to approach the suspicious person or suspicious object.

[Outline of Route Deciding Section 530] In the present embodiment, the route deciding section 530 decides a route (which may be sometimes referred to as a route to approach) for the lawn mower 230 to approach a suspicious person or suspicious object present around the land 30 and the like or a suspicious person or suspicious object that has intruded into the land 30 and the like. For example, if the abnormality detecting section 420 detected a travelling body that is likely to be a suspicious person or suspicious object inside the land 30 and the like or around the land 30 and the like, the route deciding section 530 decides a route to approach the travelling body. The route deciding section 530 may decide a route to approach based on at least one among (i) a position of the lawn mower 230, (ii) a work plan, and (iii) a work history of the lawn mowing device. The route deciding section 530 may transmit information indicating the decided route to approach to the instruction generating section 540.

[One Example of Information Processing at Route Deciding Section 530] For example, if the abnormality detecting section 420 detected a travelling body that is likely to be a suspicious person or suspicious object inside the land 30 or around the land 30 and the like, the abnormality detecting section 420 transmits, to the self-running instrument control section 430, analysis information including information indicating that a suspicious person or suspicious object has been detected. The analysis information for example includes positional information indicating a position of the suspicious person or suspicious object. Thereby, the route deciding section 530 acquires positional information indicating the position of the suspicious person or suspicious object. Also, the route deciding section 530 acquires, from the communication control section 410, positional information indicating a current position of the lawn mower 230.

Next, the route deciding section 530 decides a route to approach based on at least one among (i) a current position of the lawn mower 230, (ii) a work plan, and (iii) a work history of the lawn mowing device. For example, if the level of threat to the land 30 and the like is relatively low, the route deciding section 530 decides a route to approach such that the lawn mower 230 pass through an area, in a work area, where a lawn mowing work has not completed, taking into consideration a current position, a work plan and a work history of the lawn mower 230. On the other hand, if the level of threat to the land 30 and the like is relatively high, the route deciding section 530 decides a route to approach such that the lawn mower 230 pass through the shortest route from a current position of the lawn mower 230 to a suspicious person or suspicious object. The route deciding section 530 may decide a route to approach such that time required for the lawn mower 230 to reach the suspicious person or suspicious object is minimized.

In the present embodiment, the instruction generating section 540 generates various types of instructions. The instruction generating section 540 may generate an instruction to control the user terminal 20. The instruction generating section 540 may generate an instruction to control the lawn mower 230. The instruction generating section 540 may generate an instruction to control the lawn mower 230 based on an operation mode decided by the mode deciding section 520. The instruction generating section 540 may generate an instruction to cause the lawn mower 230 to travel based on a route to approach decided by the route deciding section 530. The instruction generating section 540 may generate an instruction to control at least one among the monitoring camera 240, the intrusion sensor 252 and the fire sensor 254.

Figure 6:
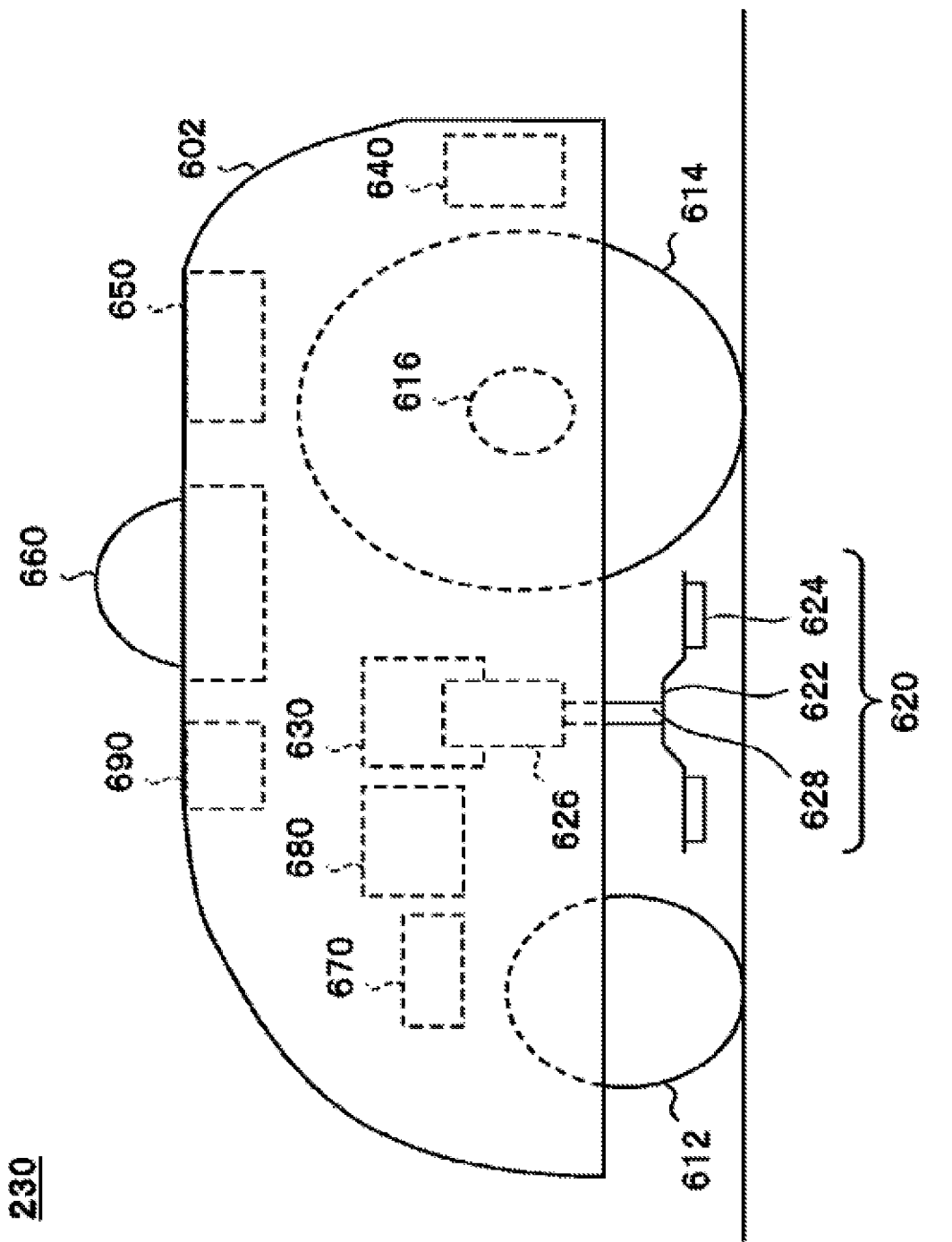
FIG. 6 schematically shows one example of the internal configuration of a lawn mower 230.
Figure 7:
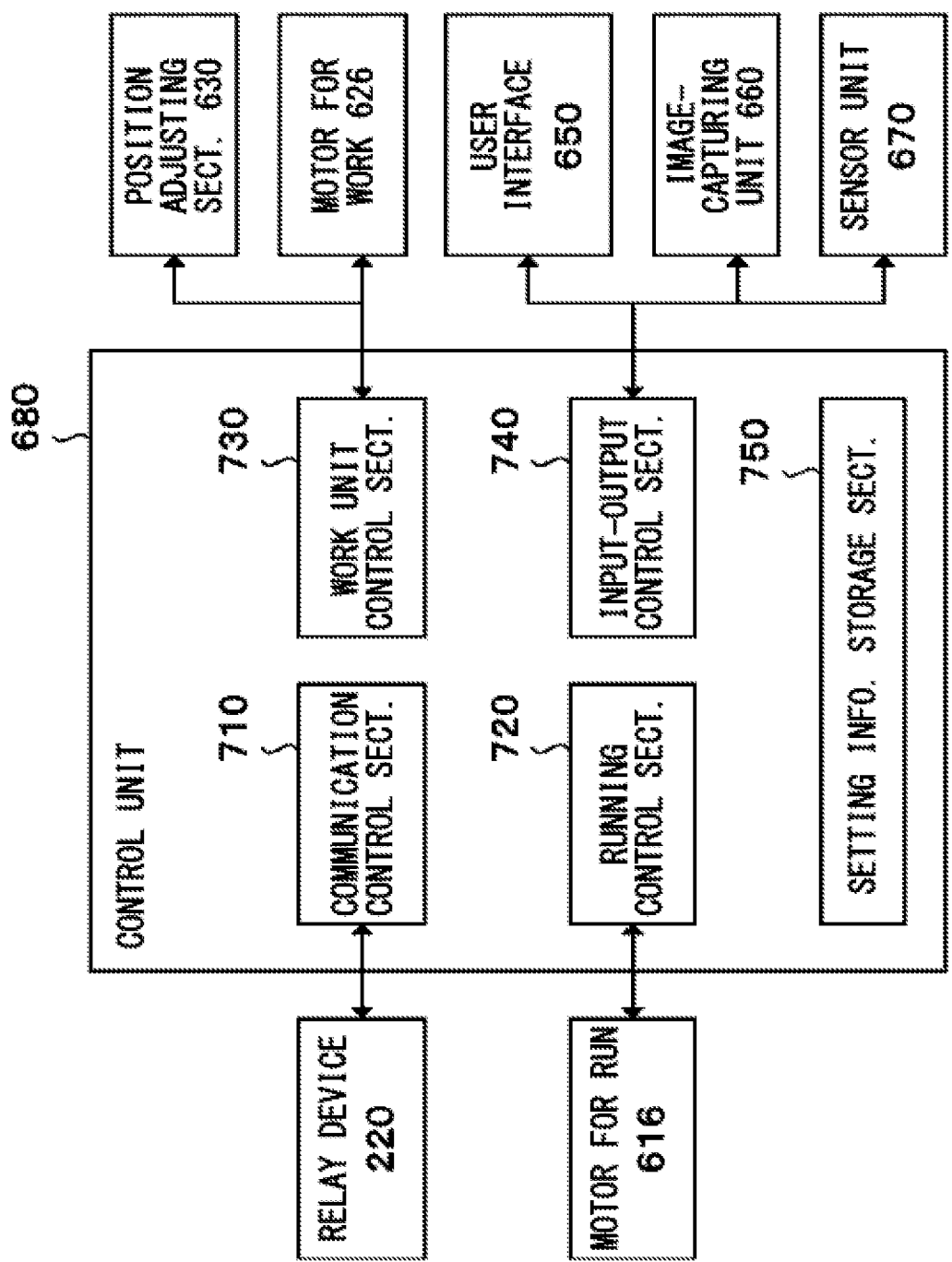
FIG. 7 schematically shows one example of the internal configuration of a control unit 680.

[Outline of Lawn Mower 230] Using FIG. 6 and FIG. 7, outline of the lawn mower 230 is explained. FIG. 6 schematically shows one example of the internal configuration of the lawn mower 230. FIG. 7 schematically shows one example of the internal configuration of a control unit 680. As shown in FIG. 6, in the present embodiment, the lawn mower 230 includes a housing 602. In the present embodiment, the lawn mower 230 includes, under the housing 602, a pair of front wheels 612 and a pair of rear wheels 614. The lawn mower 230 may include a pair of motors for run 616 that respectively drive the pair of rear wheels 614.

In the present embodiment, the lawn mower 230 includes a work unit 620. The work unit 620 for example has a blade disk 622, a cutter blade 624, a motor for work 626 and a shaft 628. The lawn mower 230 may include a position adjusting section 630 that adjusts a position of the work unit 620. The work unit 620 may be one example of a work instrument. The blade disk 622 and the cutter blade 624 may be one example of a rotor for cutting a work target.

The blade disk 622 is coupled with the motor for work 626 via the shaft 628. The cutter blade 624 may be a cutting blade for cutting lawn grasses. The cutter blade 624 is attached to the blade disk 622 and rotates together with the blade disk 622. The motor for work 626 rotates the blade disk 622.

In the present embodiment, inside the housing 602 or above the housing 602, the lawn mower 230 includes a battery unit 640, a user interface 650, an image-capturing unit 660, a sensor unit 670, the control unit 680 and a spray section 690. The image-capturing unit 660 may be one example of an image-capturing section or an image acquiring section. The control unit 680 may be one example of a control device. The spray section 690 may be one example of an intimidating section.

In the present embodiment, the battery unit 640 supplies electric power to each section of the lawn mower 230. In the present embodiment, the user interface 650 receives a user input. The user interface 650 outputs information to a user. The user interface 650 may output an alert message to a suspicious person. Examples of the user interface 650 may include a keyboard, a pointing device, a microphone, a touch panel, a display, a speaker and the like.

In the present embodiment, the image-capturing unit 660 captures an image of the space around the lawn mower 230. The image-capturing unit 660 may capture an image of the land 30 and the like. The image-capturing unit 660 may capture an image of a suspicious person or suspicious object. The image-capturing unit 660 may capture an image of lawn grasses to be a work target of the lawn mower 230. The image-capturing unit 660 may capture an image of lawn grasses cut by the lawn mower 230. The image-capturing unit 660 may acquire a still image of an object or acquire a moving image of an object. The lawn mower 230 may include a plurality of image-capturing units 660. A single image-capturing unit 660 may have a plurality of image sensors. The image-capturing unit 660 may be a 360-degree angle camera.

In the present embodiment, the sensor unit 670 includes various types of sensors. The sensor unit 670 transmits outputs of various types of sensors to the control unit 680. Examples of the sensors may include a GPS signal receiver, a beacon receiver, a radio field intensity measuring machine, an acceleration sensor, an angular speed sensor, a wheel speed sensor, a contact sensor, a magnetic sensor, a temperature sensor, a humidity sensor, a soil water sensor and the like.

In the present embodiment, the control unit 680 controls operation of the lawn mower 230. According to one embodiment, the control unit 680 controls the pair of motors for run 616 to control travel of the lawn mower 230. According to another embodiment, the control unit 680 controls the motor for work 626 to control a lawn mowing work of the lawn mower 230.

In one embodiment, the control unit 680 may control the lawn mower 230 based on control information from the managing server 210. For example, the control unit 680 controls the lawn mower 230 according to an instruction generated by the instruction generating section 540 of the managing server 210. In another embodiment, the control unit 680 may execute at least part of information processing at the managing server 210. The control unit 680 may control the lawn mower 230 based on a result of the above-mentioned information processing.

In the present embodiment, the spray section 690 sprays liquid or gas. The spray section 690 may spray liquid or gas for crime prevention. The spray section 690 may spray liquid or gas for crime prevention on a suspicious person or suspicious object. The liquid for crime prevention may include at least one among fluorescent paint, adhesive and smelly component. The gas for crime prevention may include at least one among a lachrymatory component, a hypnotic component and smelly component. Thereby, it is possible to intimidate a suspicious person or suspicious object. Other examples of the intimidating section may include a solid body launching device, a high-voltage generating device, a loud-sound generating device, and the like. Examples of a solid body launched from the solid body launching device may include a rubber bullet, fertilizer, a member to be used for maintenance (which is for example spare screw, spare blade or the like), a blade and the like.

As shown in FIG. 7, in the present embodiment, the control unit 680 includes a communication control section 710, a running control section 720, a work unit control section 730, an input-output control section 740 and a setting information storage section 750. The communication control section 710 may be one example of a notifying section or an image acquiring section. The running control section 720 may be one example of a travel control section. The work unit control section 730 may be one example of a work control section.

In the present embodiment, the communication control section 710 controls communication with an instrument located outside the lawn mower 230. The communication control section 710 may be a communication interface compatible with one or more communication systems. Examples of the instrument located outside may include the user terminal 20, the managing server 210, the relay device 220, the monitoring camera 240, the intrusion sensor 252, the fire sensor 254 and the like. The communication control section 710 may acquire, as necessary and from the monitoring camera 240, image data of an image captured by the monitoring camera 240. The communication control section 710 may acquire, as necessary, information indicating a result of sensing from the intrusion sensor 252 or fire sensor 254.

In the present embodiment, the running control section 720 controls the motors for run 616 to control travel of the lawn mower 230. The running control section 720 may control the motors for run 616 based on an operation mode decided by the mode deciding section 520. The running control section 720 may control the motors for run 616 based on a route to approach decided by the route deciding section 530. The running control section 720 controls autonomous run of the lawn mower 230. For example, the running control section 720 controls at least one among a travel speed, a travel direction and a travel route of the lawn mower 230.

In the present embodiment, the work unit control section 730 controls the work unit 620. The work unit control section 730 may control the work unit 620 based on an operation mode decided by the mode deciding section 520. The work unit control section 730 may control at least one among the type of work, strength of work and schedule of work of the work unit 620. For example, the work unit control section 730 controls the motor for work 626 to control the strength of work of the work unit 620. The work unit control section 730 may control the position adjusting section 630 to control the strength of work of the work unit 620.

In the present embodiment, the input-output control section 740 receives an input from at least one among the user interface 650, the image-capturing unit 660 and the sensor unit 670. The input-output control section 740 outputs information to the user interface 650. The input-output control section 740 may control at least one among the user interface 650, the image-capturing unit 660 and the sensor unit 670. For example, the input-output control section 740 controls at least one instrument among the user interface 650, the image-capturing unit 660 and the sensor unit 670 by adjusting setting of the instrument.

In the present embodiment, the input-output control section 740 may control at least one among the user interface 650, the image-capturing unit 660 and the sensor unit 670 based on an operation mode decided by the mode deciding section 520. For example, the input-output control section 740 outputs an alert message to a suspicious person from the user interface 650 based on an operation mode decided by the mode deciding section 520. The input-output control section 740 may decide an object of the image-capturing unit 660 based on an operation mode decided by the mode deciding section 520.

In the present embodiment, the setting information storage section 750 stores various types of setting information necessary for control of the lawn mower 230. For example, the setting information storage section 750 stores information indicating a correspondence between a security level of the land 30 and the like and an operation mode of the lawn mower 230. The setting information storage section 750 may store information indicating the above-mentioned correspondence for each among a plurality of security levels. The setting information storage section 750 may store information indicating a correspondence between an operation mode of the lawn mower 230 and a resource of the lawn mower 230. The setting information storage section 750 may store information indicating the above-mentioned correspondence for each among a plurality of operation modes.

FIG. 8 schematically shows one example of a data table 800. The data table 800 may be one example of information indicating a correspondence between a security level of the land 30 and the like and an operation mode of the lawn mower 230. The data table 800 may be one example of setting information stored in the setting information storage section 750. In the present embodiment, the data table 800 stores, in association with each other, security levels 802, operation modes 804 of a lawn mowing work, operation modes 806 of a security work.

In the data table 800, a high-speed mode is an operation mode in which an operation is performed to reduced work time as compared with a standard operation mode. A power-save mode is an operation mode in which an operation is performed to reduce consumed energy as compared with a standard operation mode.

In the data table 800, a motion image tracking mode is an operation mode in which a motion image captured by the image-capturing unit 660 is analyzed to track a suspicious person or suspicious object. In the motion image tracking mode, the lawn mower 230 travels according to an initial work plan. A close-up monitoring mode is an operation mode in which close-up monitoring is performed on a suspicious person or suspicious object. In the close-up monitoring mode, the lawn mower 230 updates a work plan as necessary, and approaches a suspicious person or suspicious object.

In the data table 800, a tracking/alert mode is an operation mode in which tracking is performed physically on a suspicious person or suspicious object. In the tracking/alert mode, the lawn mower 230 outputs an alert message to a suspicious person or suspicious object as necessary. An intimidation mode is an operation mode in which a suspicious person or suspicious object is intimidated, following physical tracking of the suspicious person or suspicious object. For example, the lawn mower 230 sprays liquid or gas for crime prevention on a suspicious person or suspicious object.

FIG. 9 schematically shows one example of a data table 900. The data table 900 may be one example of information indicating a correspondence between an operation mode of the lawn mower 230 and a resource of the lawn mower 230. In the present embodiment, the data table 900 indicates a correspondence between operation modes of a lawn mowing work and resources of the lawn mower 230. The data table 900 may be one example of setting information stored in the setting information storage section 750. In the present embodiment, the data table 900 stores, in association with each other, operation modes 902 of a lawn mowing work, control methods 904 of the motors for run 616, and control methods 906 of the work unit 620. The data table 900 may store, in association with each other, the operation modes 902 of a lawn mowing work and control methods of the image-capturing unit 660. The motors for run 616, the work unit 620 and the image-capturing unit 660 may be one example of a resource of the lawn mower 230.

In the data table 900, a quality prioritized mode is an operation mode in which the state of lawn grasses after lawn mowing is observed utilizing the image-capturing unit 660, and the motors for run 616 and the work unit 620 are controlled based on the state of lawn grasses. Thereby, the work quality of a lawn mowing work can be maintained at high level.

Figure 10:
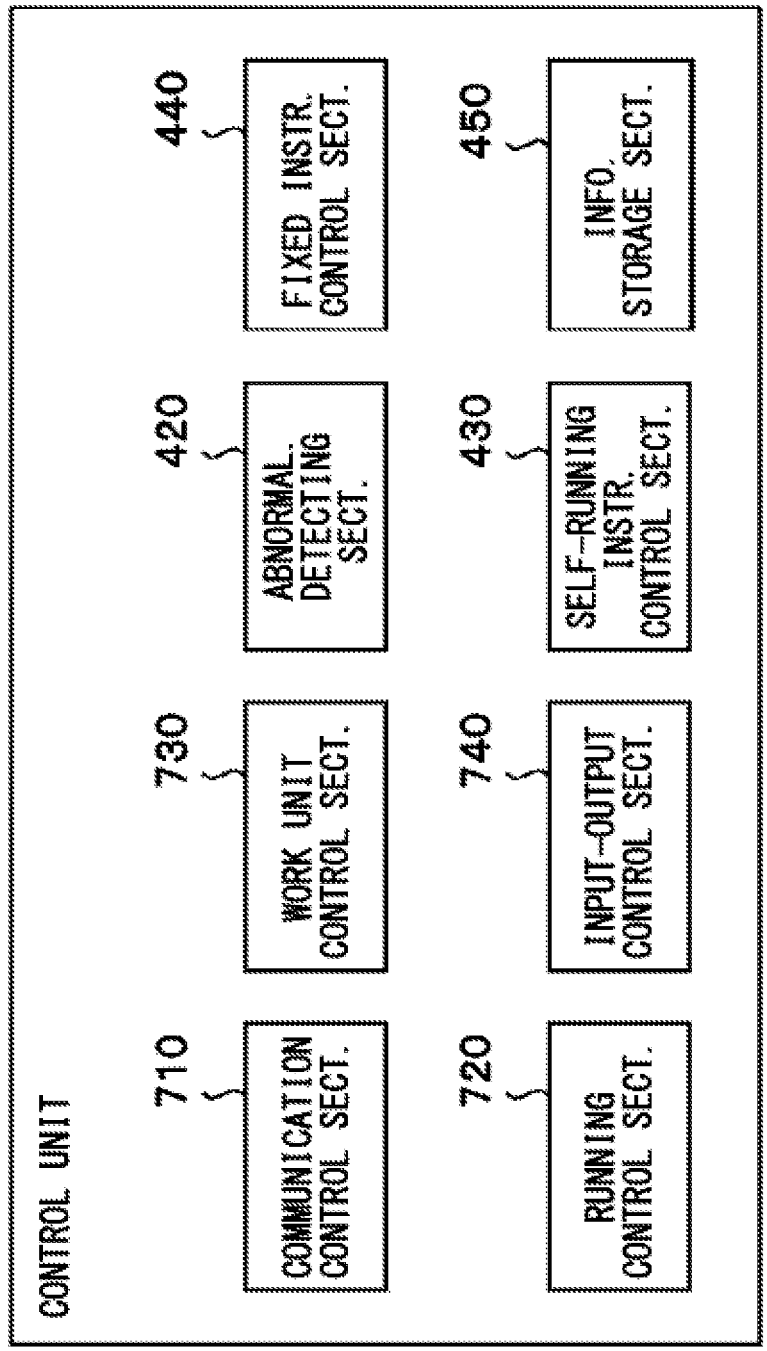
FIG. 10 schematically shows another example of the internal configuration of the control unit 680.

FIG. 10 schematically shows another example of the internal configuration of the control unit 680. According to the embodiment explained using FIG. 7, the managing server 210 has the abnormality detecting section 420, the self-running instrument control section 430, the fixed instrument control section 440 and the information storage section 450, and various types of processing about control of the lawn mower 230 are executed at the managing server 210. In the embodiment of FIG. 7, the control unit 680 controls the lawn mower 230 based on a control signal from the managing server 210.

The embodiment explained using FIG. 10 is different from the embodiment of FIG. 7 in that the abnormality detecting section 420, the self-running instrument control section 430, the fixed instrument control section 440 and the information storage section 450 are disposed in the control unit 680. In the present embodiment, the running control section 720 and the work unit control section 730 control at least one among the motors for run 616, the motor for work 626 and the position adjusting section 630 based on an instruction generated by the self-running instrument control section 430 disposed in the control unit 680. In other respects, it may have a similar configuration to that in the embodiment of FIG. 7.

In the present embodiment explained, the control unit 680 has the abnormality detecting section 420, the self-running instrument control section 430, the fixed instrument control section 440 and the information storage section 450. However, the control unit 680 is not limited to the present embodiment. In another embodiment, the control unit 680 may not have at least one among the self-running instrument control section 430, the fixed instrument control section 440 and the information storage section 450. For example, the control unit 680 may not have the information storage section 450. In still another embodiment, the control unit 680 may have some configurations among a plurality of configurations included in the self-running instrument control section 430.

While the embodiments of the present invention have been described, the technical scope of the invention is not limited to the above described embodiments. It is apparent to persons skilled in the art that various alterations and improvements can be added to the above-described embodiments. Also, matters explained with reference to a particular embodiment can be applied to other embodiments unless such application causes a technical contradiction. It is also apparent from the scope of the claims that the embodiments added with such alterations or improvements can be included in the technical scope of the invention.

The operations, procedures, steps, and stages of each process performed by an apparatus, system, program, and method shown in the claims, embodiments, or diagrams can be performed in any order as long as the order is not indicated by "prior to," "before," or the like and as long as the output from a previous process is not used in a later process. Even if the process flow is described using phrases such as "first" or "next" in the claims, embodiments, or diagrams, it does not necessarily mean that the process must be performed in this order.

What is claimed is:

1. A control device that controls a monitoring device having an autonomous travel function, the control device comprising:
    a detecting section that detects a change in a target of monitoring of the monitoring device; and
    an operation mode deciding section that decides an operation mode of the monitoring device according to a detail of the change in the target of monitoring detected by the detecting section, wherein
    the monitoring device has a work instrument for executing a second work different from a first work selected from a group consisting of a monitoring work, a security work and a guard work for the target of monitoring,
    the operation mode deciding section has:
        an alert level deciding section that decides an alert level indicating a level of threat to the target of monitoring, according to the detail of the change in the target of monitoring detected by the detecting section; and
        a second operation mode deciding section that decides a second operation mode indicating a detail of an operation about the second work, according to the alert level decided by the alert level deciding section.

2. The control device according to claim 1, wherein the operation mode deciding section has a first operation mode deciding section that decides a first operation mode indicating a detail of an operation about at least one among a monitoring work, a security work and a guard work of the monitoring device, according to the alert level decided by the alert level deciding section.

3. The control device according to claim 1, further comprising a work plan deciding section that decides a work plan of the work instrument according to (i) the detail of the change in the target of monitoring detected by the detecting section or (ii) the alert level decided by the alert level deciding section.

4. The control device according to claim 3, wherein the work plan includes information about at least one among:
    (i) the work target of the work instrument;
    (ii) timing or a sequence for the work instrument to execute a work;
    (iii) a type of a resource of the monitoring device or the control device allocated to an operation of the work instrument;

(iv) an amount or ratio of a resource of the monitoring device or the control device allocated to an operation of the work instrument;

(v) a detail of a process executed by a resource of the monitoring device or the control device allocated to an operation of the work instrument;

(vi) a type of a resource of the monitoring device or the control device allocated to an at least one operation among monitoring, security and guard of the monitoring device;

(vii) an amount or ratio of a resource of the monitoring device or the control device allocated to at least one operation among monitoring, security and guard of the monitoring device, and (viii) a detail of a process executed by a resource of the monitoring device or the control device allocated to at least one operation among monitoring, security and guard of the monitoring device.

5. The control device according to claim 3, wherein if the alert level decided by the alert level deciding section is changed while the work instrument is working, the work plan deciding section decides whether the work plan needs to be updated or not.

6. The control device according to claim 5, further comprising a storage section that stores information about a work before being updated, if the work plan deciding section decides to update the work plan.

7. The control device according to claim 3, wherein
the target of monitoring is a monitoring area having a predetermined geographic range,
the monitoring device travels at least in the monitoring area, and
the control device further comprises:
a positional information acquiring section that acquires positional information indicating a position of the monitoring device; and
an approach route deciding section that decides a route to approach a travelling body that is likely to be a suspicious person or suspicious object based on (i) the position of the monitoring device acquired by the positional information acquiring section and (ii) the work plan, if the detecting section has detected the travelling body in the monitoring area or around the monitoring area.

8. The control device according to claim 7, wherein the approach route deciding section decides a route to approach the travelling body based on (i) the position of the monitoring device acquired by the positional information acquiring section, (ii) the work plan and (iii) a work history of the work instrument.

9. The control device according to claim 7, further comprising a sensor information acquiring section that acquires sensor information indicating a result of measurement by a sensor that monitors the target of monitoring, wherein
the detecting section has:
a travelling body detecting section that detects the travelling body based on the sensor information acquired by the sensor information acquiring section; and
a travelling body judging section that judges whether or not the travelling body detected by the travelling body detecting section is a suspicious person or suspicious object.

10. The control device according to claim 1, wherein
the target of monitoring is a monitoring area having a predetermined geographic range,
the monitoring device travels at least in the monitoring area, and
the control device further comprises:
a positional information acquiring section that acquires positional information indicating a position of the monitoring device; and
an approach route deciding section that decides a route to approach a travelling body that is likely to be a suspicious person or suspicious object based on (i) the positional information acquired by the positional information acquiring section and (ii) a work history of the work instrument, if the detecting section has detected the travelling body in the monitoring area or around the monitoring area.

11. The control device according to claim 1, wherein
the target of monitoring is a monitoring area having a predetermined geographic range,
the monitoring device travels at least in the monitoring area, and
the control device further comprises:
a positional information acquiring section that acquires positional information indicating a position of the monitoring device; and
an approach route deciding section that decides a route to approach a travelling body that is likely to be a suspicious person or suspicious object based on the position of the monitoring device acquired by the positional information acquiring section, if the detecting section has detected the travelling body in the monitoring area or around the monitoring area.

12. The control device according to claim 1, wherein
the operation mode deciding section has a first operation mode deciding section that decides a first operation mode indicating a detail of an operation about the first work, according to the alert level decided by the alert level deciding section; and
the control device controls the monitoring device such that the first operation mode and the second operation mode corresponding to the decided alert level are performed simultaneously.

13. The control device according to claim 1, wherein
the first operation mode includes a motion image tracking mode in which a motion image captured by an image-capturing section for capturing an image of the target of monitoring is analyzed to track a suspicious person or suspicious object, and a close-up monitoring mode in which close-up monitoring is performed on the suspicious person or the suspicious object, and
the control device further comprises: a work plan deciding section that decides a work plan of the work instrument according to (i) the detail of the change in the target of monitoring detected by the detecting section or (ii) the alert level decided by the alert level deciding section, wherein
if the alert level decided by the alert level deciding section is changed while the work instrument is working, the work plan deciding section decides whether the work plan needs to be updated or not, and
if the motion image tracking mode is decided as the first operation mode, the work plan deciding section decides not to update the work plan while if the close-up monitoring mode is decided as the first operation mode, the work plan deciding section decides to updates the work plan.

14. A monitoring device comprising:
the control device according to claim 1; and
an image-capturing section that captures an image of the target of monitoring, wherein the detecting section detects a change in the target of monitoring based on the image captured by the image-capturing section.

15. A non-transitory computer readable medium storing thereon a program for controlling a monitoring device having an autonomous travel function, wherein
the program causes a computer to execute:
a detection procedure of detecting a change in a target of monitoring of the monitoring device;
an operation mode decision procedure of deciding an operation mode of the monitoring device according to a detail of the change in the target of monitoring detected in the detection procedure; and
a control procedure of controlling the monitoring device based on the operation mode decided in the operation mode decision procedure,
wherein
the monitoring device has a work instrument for executing a second work different from a first work selected from a group consisting of a monitoring work, a security work and a guard work for the target of monitoring, and
the operation mode deciding procedure has:
an alert level deciding procedure that decides an alert level indicating a level of threat to the target of monitoring, according to the detail of the change in the target of monitoring detected by the detection procedure; and
a second operation mode deciding procedure that decides a second operation mode indicating a detail of an operation about the second work, according to the alert level decided by the alert level deciding procedure.

16. The non-transitory computer readable medium according to claim 15, wherein
the monitoring device further has a processor, and
the computer is the processor of the monitoring device.

17. The non-transitory computer readable medium according to claim 15, wherein,
the operation mode deciding procedure has a first operation mode decision procedure that decides a first operation mode indicating a detail of an operation about the first work, according to the alert level decided by the alert level decision procedure, and
the control program further causes the computer to execute a control procedure of controlling the monitoring device such that the first operation mode and the second operation mode corresponding to the decided alert level are performed simultaneously.

* * * * *